March 8, 1927.  
G. C. HOSCH  
1,619,935  
SHUTTER FOR MEASURING MACHINE CHARTS  
Filed Nov. 15, 1920  2 Sheets-Sheet 1
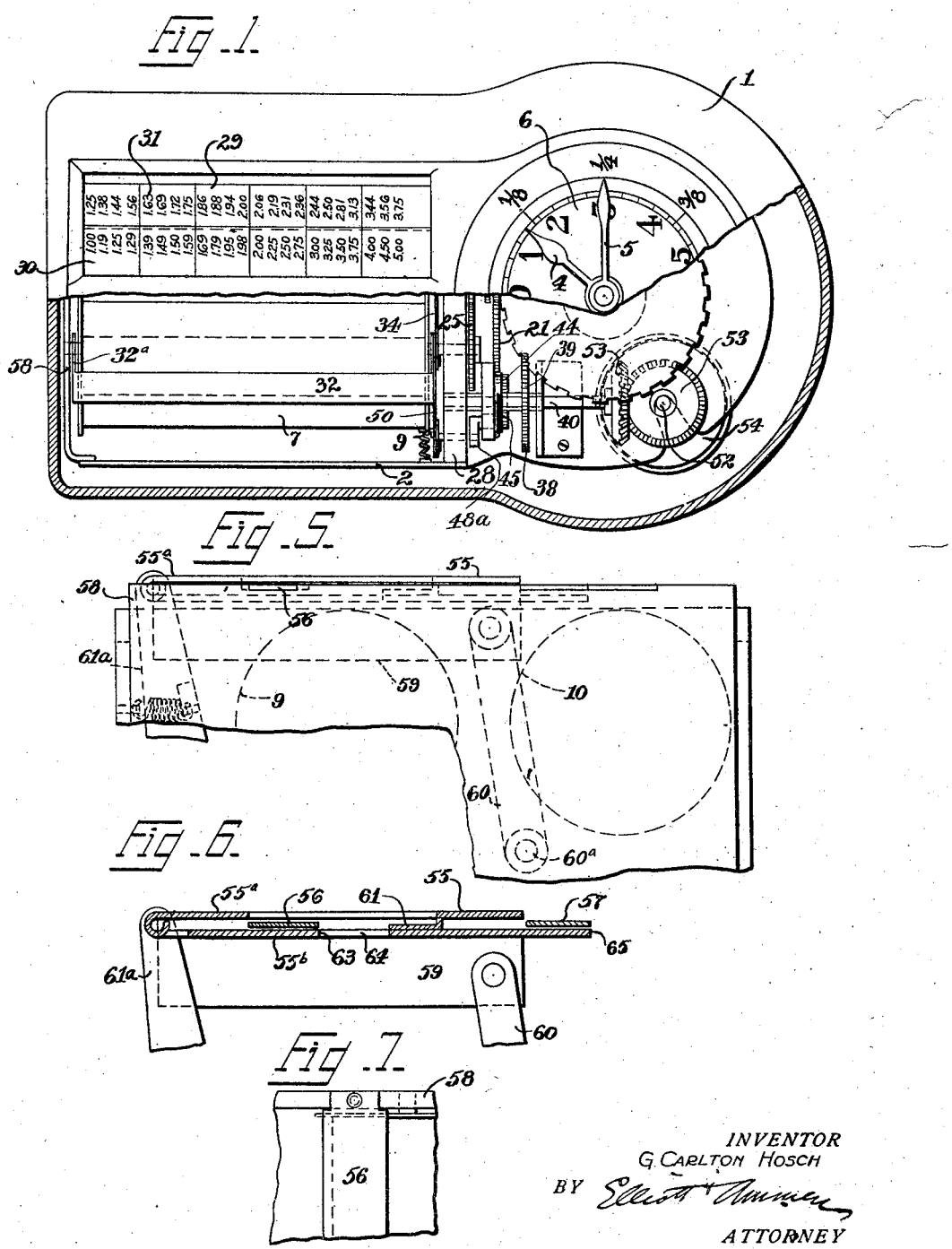
INVENTOR  
G. CARLTON HOSCH  
BY  
ATTORNEY March 8, 1927.
G. C. HOSCH
1,619,935
SHUTTER FOR MEASURING MACHINE CHARTS
Filed Nov. 15, 1920    2 Sheets-Sheet 2
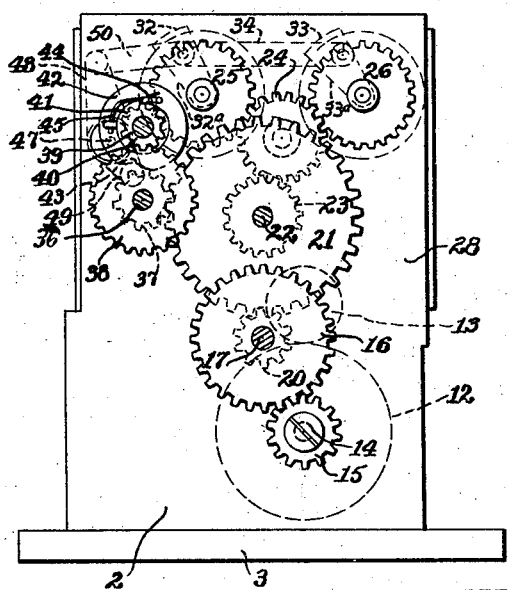
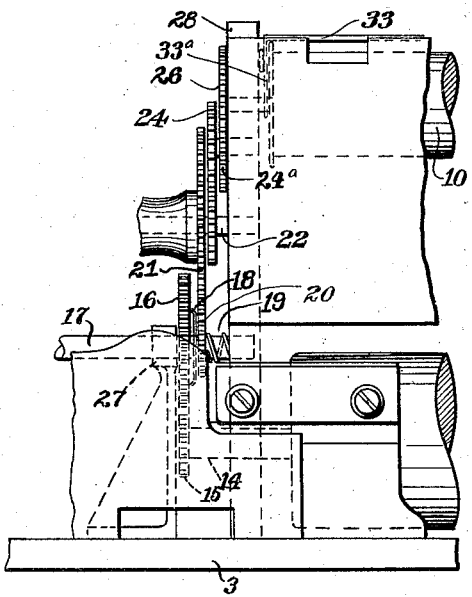
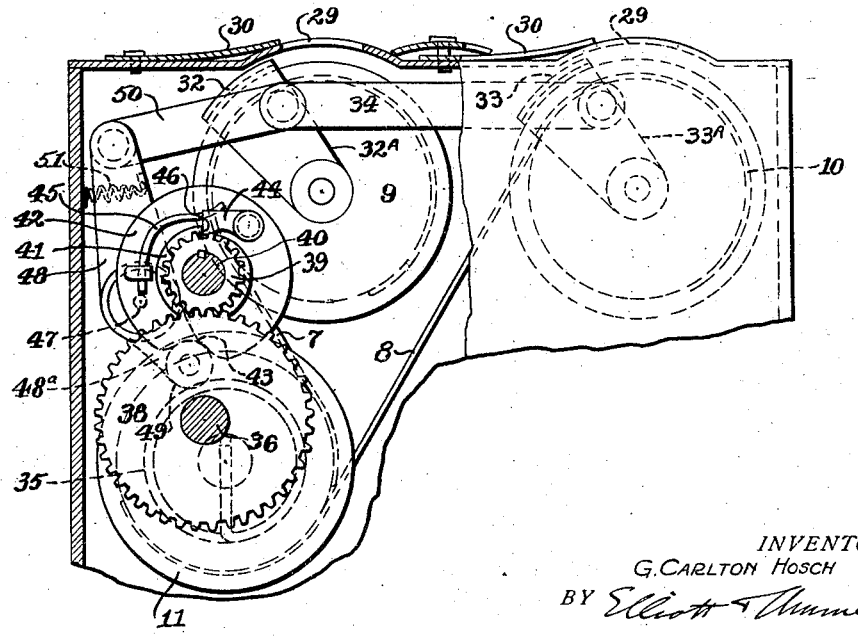
INVENTOR
G. CARLTON HOSCH
BY
ATTORNEY Patented Mar. 8, 1927.

1,619,935

UNITED STATES PATENT OFFICE.

GREENE CARLTON HOSCH, OF ST. LOUIS, MISSOURI, ASSIGNOR TO THE MEASURE-GRAPH COMPANY, OF ST. LOUIS, MISSOURI, A CORPORATION OF DELAWARE.

SHUTTER FOR MEASURING-MACHINE CHARTS.

Application filed November 15, 1920. Serial No. 424,173.

This invention relates to indicating machines of the type in which various computations are displayed in the operation of the machine according to the law thereof, representing the product of a unit of measure or a fraction or multiple thereof, or a multiple of said unit plus a fractional part thereof, and different indication of value for the unit. The broad object of the invention is to prevent in such a machine the association of the computations relative to the characteristic function of the machine unless, in the operation of said machine, the unit of measure or a multiple or fraction of said unit is properly correlated with the indications of value, so that said computations can only be used when indicating the product of the factors on which they are based.

While the principle of my invention is applicable to various kinds of machines of the type above referred to, I contemplate that the same will find its greatest utility in its application to fabric measuring and cost computing machines, and the accompanying drawings show such application of the same in a preferred embodiment of the invention, and a modification thereof.

In these machines, and especially in the type of machine forming the subject of various patents to the late Walter E. Hosch, a measuring dial and a measuring roller are co-ordinated so that as the fabric is passed through the machine the hands of the dial will be rotated to indicate the length of goods measured. There is also provided a chart adapted to be moved under a slot, or slots, by the rotation of the measuring roller and containing computations indicating costs of certain measurements, and adjacent each slot is a row of figures indicating price per unit of measure. The computations on the moving chart are usually based on the yard as a unit, and are calculated for the unit of measure, multiples thereof and fractions, or aliquot parts of the unit. In practice one-eighth of a yard, or four and a half inches, is the smallest division of a yard for which a computation is prepared. As machines of this type are relatively small it will be apparent that the movement of the goods through the machine is relatively great as compared to the corresponding movement of the computation chart; hence it very often occurs that the customer will purchase a few inches more than the unit of measure or a multiple thereof, but less than an aliquot division thereof for which computation has been made, with the result that the computation chart will be moved in the measuring operation sufficiently to turn the computations based on the next highest divisional part of the unit of measures for which computations have been made into view, and the clerk will read the computation corresponding to such division of the unit of measure and apply it to the length of goods actually measured at the price at which it was sold. This results in the customer paying more than the length of goods measured justifies. For example, in the case of goods costing several dollars per yard, a customer may order a yard and six inches of the material. In measuring the goods the computation chart will be turned to bring the computations for a yard and a quarter substantially into full view, although not in exact alignment with the contemplated reading point, and the clerk may apply the computation corresponding to a yard and a quarter of the material at the price at which it is sold. At the head of each column of computations is the length of goods to which said computations apply, for example, 1 yard, 1⅛ yards, 1¼ yards, 1⅜ yards, 1½ yards, 1⅝ yards, 1¾ yards, 1⅞ yards, 2 yards, etc. It also may occur that a clerk in measuring a length of material for which the machine is calibrated will observe the computation chart in place of the measuring dial, and will stop the measurement when the indication of the measurement at the top of a column comes into view, and read the appropriate computation from the column, although, the full length of goods ordered may not have been drawn through the machine; and the difference between the goods purchased and the length of goods actually measured may amount to several inches. This results in the customer getting a less amount of goods than purchased and paying more than the amount received justifies. Finally, the amount of goods ordered may only exceed an aliquot division of the unit of measure sufficiently to slightly move the column of computations for such division across the sight opening or slot without bringing the column for the next highest series of computations into view, and the clerk may read the computation appropriate to the fractional measurement indicated and apply it to the actual measurement of the goods, thereby receiving less than the amount of goods sold justifies.

As applied to cloth measuring and cost computing machines, therefore, a specific object of the invention is to prevent the application of computations provided by the machine to the length of material measured unless such length is for the unit of measure, or a multiple or fraction thereof, on which the computations are based. In the preferred embodiment of my invention illustrated in the drawings, this object of the invention is accomplished by the provision of a shutter which normally conceals the computations from view and which is moved to disclose a column of computations only when the measuring dial indicates a length corresponding to the unit of measure or a multiple or fraction thereof. Thus, if the length of goods in excess of the unit of measure or multiple thereof, is not one of the aliquot fractions of the yard for which the machine is calibrated, the shutter will close the sight opening or slot and no computations can be read.

It will be obvious from the above disclosure that various means of accomplishing the purposes of my invention may be resorted to other than that disclosed in the preferred embodiment and the modification thereof illustrated in the drawings without departing from the principle of my invention, which contemplates rendering unusable the computing feature of the machine unless the exact length of goods for which computations are provided is actually measured.

Further objects of the invention will appear hereinafter.

The invention consists in the novel features, and in the general combination of parts to be particularly described hereinafter, all of which contribute to produce a simple and efficient shutter for a measuring machine chart. A preferred embodiment of my invention will be particularly described in the following specification, while the broad scope of my invention will be pointed out in the appended claims.

In the drawing,

Figure 1 is a plan of a machine embodying my invention, broken away and shown partially in section;

Figure 2 is a vertical section through the machine with the casing removed and illustrating the general relation of the driving mechanism;

Figure 3 is a side elevation partially broken away and further illustrating the mechanism;

Figure 4 is a section looking in the same direction as Figure 2 but upon an enlarged scale, certain parts being broken away;

Figure 5 is a view somewhat similar to Figure 4, but illustrating a modification of the invention;

Figure 6 is a vertical section further illustrating details of the modification shown in Figure 5; and Figure 7 is a fragmentary plan further illustrating details of the invention.

In the type of machine to which I have described my invention as applied, a movable member, for example, a chart, carries computations, the indicating numbers of the computations being computed as functions of the price per unit, and the length of the piece of the goods measured. When the instrument is measuring, these computations are displayed in succession, each computed number being associated with a certain corresponding measured length. In practicing my invention, I provide means for preventing visible association by the machine of any computed number with an exactly indicated measurement, unless it corresponds to that measurement. This is preferably accomplished by means of a shutter mounted adjacent to the field of vision and controlled in such a way as to prevent reading of the instrument unless a proper correspondence exists between the length of goods actually measured by the machine and the computed cost.

The machine illustrated comprises a casing 1, in which there is mounted a frame 2 carried on a suitable base 3. The indicating mechanism of the instrument may include a slow moving pointer 4 and a co-axial fast moving pointer 5, both of which are mounted to revolve above a dial 6 mounted in the upper wall of the casing; the dial 6 has large divisions to indicate a unit of measure, such as a yard, and with these divisions the slow moving pointer co-operates. In addition to this, the dial is provided with aliquot divisions ⅛, ¼, and ⅜, etc., to indicate fractions of a yard, and the fast moving pointer or large hand co-operates with these fraction numbers. These hands or pointers are driven so that at each revolution of the fast moving pointer 5, the hand 4 will travel the distance between two of the large division points of the scale. These pointers may be driven in any suitable manner, such as that illustrated in Patent Number 1,336,230. The indicating mechanism also includes a chart or charts driven in unison with the hands 4 and 5 and these charts carry indicating numbers which are computed charges for the different quantities of material measured and indicated by the hands 4 and 5. In the present instance I provide two charts 7 and 8 (see Fig. 4), the upper ends of these charts being carried on take-up rollers 9 and 10 respectively, and the lower parts of the charts being wound upon a supply drum or spring roller 11.

In operating the machine, the article to be measured imparts movement to the indicating mechanism. In the present machine the fabric to be measured is pulled between a measuring roller 12 (see Fig. 2) and a presser roller indicated at 13. Suitable driving mechanism is provided for driving the take-up rollers, and the pointers from the measuring roller. In the present instance the shaft 14 of the measuring roller carries a pinion 15 which drives a gear wheel 16 on a clutch shaft 17. The gear wheel 16 constitutes a clutch member co-operating with a movable clutch member 18 (see Fig. 3) and when the clutch is held closed by a spring 19 on the inner end of the clutch shaft, the rotation of the gear wheel 16 will be imparted to a pinion 20. The pinion 20 drives a large gear wheel 21 on a fixed arbor 22 (see Fig. 2) and a pinion 23 rigid with gear 21 actuates an idler 24 rigid with an idler 24ª of the same diameter, which meshes with two gear wheels 25 and 26 which are rigidly secured to the shafts of the two take-up rollers 9 and 10. The mechanism for driving the hands 4 and 5 is not illustrated as the same is fully illustrated in the patent referred to above. The clutch composed of the parts 16 and 18 may be opened by shoving in on the clutch shaft 17. In this connection it should be understood that the clutch shaft slides freely through a bearing 27 which supports it, the inner end of the shaft being mounted to slide freely in a vertical frame plate 28. The gear wheel 16 is, of course, loose on the shaft 17 and the pinion 20 is also loose on this shaft. A very slight movement of the shaft 17 is sufficient to open the clutch and hence no disengagement of the pinion 20 and gear wheel 21 occurs in the movement that opens the clutch. Clutch member 18 is rigid with gear 20.

The reading point of this instrument is located at two windows, such as the window 29 formed in the upper side of the casing 1. There is one of these windows 29 corresponding to each of the take-up rollers 9 and 10 and each window is provided with a fixed scale 30 extending longitudinally over its corresponding take-up roller and bearing figures corresponding to different prices per yard. The charts 7 and 8 carry indicating numbers 31 which correspond to the different amounts which may be indicated by the hands 4 and 5, and these numbers 31 align with the corresponding numbers on the scale 30. It should be understood that in the operation of the instrument, if the same is operated carelessly so that the hands 4, 5 do not exactly indicate the amount of fabric desired, the indicating number 31 of the chart will not be truly aligned with the reading point. This leads to inaccuracies and mistakes in the use of the instrument. In order to overcome this I provide means for preventing a reading of the instrument being taken unless the measurement is accurately indicated by the instrument. To do this, I prefer to provide means for normally covering the reading point to conceal either the numbers on the chart or its co-operating scale; and I control this means by automatic mechanism that periodically moves the same to permit a reading to be taken. In the present embodiment it discloses any indicating number when it is substantially truly aligned with the reading point. In other words, I provide means for preventing taking any reading from the instrument unless the number to be read is accurately or substantially truly aligned at the reading point. I provide shutters 32 and 33 (see Figs. 1 and 4) corresponding to each take-up roller. Any suitable means may be provided for supporting and automatically actuating these shutters; they are normally held in a position to screen the reading point. This evidently can be accomplished by screening the scale or the chart, or both the scale and chart. Each shutter consists of an elongated strip bent transversely into arcuate form and terminating in an arm at each end; 32ª indicates the arms on the shutter 32 and 33ª indicates the arms on the shutter 33 (see Fig. 4). These arms are pivotally mounted on the shafts of the rollers 9 and 10 and are preferably connected by a link 34 so that the two shutters can be operated in unison.

In order to operate the shutters as suggested, I provide a device which is so constructed that it will operate to actuate the shutters periodically, but which is constructed in such a way that it will not operate the shutters when the indicating mechanism is returning to zero. In this connection, it should be understood that the drum or supply roller 11 (see Fig. 4) is provided with a spring 35 of any suitable construction, the function of which is to wind up the charts 7 and 8 upon the drum after a measurement has been made and after the clutch composed of the members 16 and 18 has been opened.

For this purpose I provide a horizontal shaft 36 (see Figs. 2 and 4) carrying a pinion 37 driven by the large gear 21. The shaft 36 carries a rigid gear wheel 38 which meshes with a pinion 39 carried rigidly on a shaft 40. Associated with the shaft 40 I provide a one-way drive connection which operates to actuate the shutter when the indicating mechanism is moving in the forward direction, but which inhibits the operation of the shutter when the indicating mechanism is being returned to zero by the spring 35. For this purpose the shaft 40 carries rigidly a small ratchet wheel 41 and adjacent to this ratchet wheel there is provided a pawl carrier 42 which is in the form of a cam, that is to say, the edge of the pawl carrier has a cam notch 43. This part carries a pawl 44 which is pressed by a spring 45 so as to enable it to co-operate with a shoulder or tooth 46 of the ratchet wheel. Pivotally mounted on stub shaft 47 on the inner side of frame plate 28, I provide a lever 48; on the outer side of plate 28 shaft 47 carries a rigid arm 48ª with a roller 49 running on the edge of the pawl carrier, or cam 42; the lever 48 is connected by a link 50 with the adjacent arm 32ª of the shutter 32. A coil spring 51 attached to lever 48 holds the roller 49 against the edge of the cam 42. The driving gears that drive the shaft 40 are so proportioned that the cam 42 will make one complete revolution in synchrony with each presentation of the indicating numbers 31 at the reading point. In other words, when one of the indicating numbers 31 is presented at the reading point, the parts will have the relation indicated in Figure 4, that is to say, the roller 49 will lie in the notch of the cam and the spring 51 will be operating to hold the shutters 32 and 33 in their withdrawn position. As soon as the indicating mechanism moves away from this position, the roller 49 will roll on the regular or circular edge of the cam 42 and this will hold the shutters 32 and 33 in a position to cover the reading point over the take-up rollers 9 and 10 directly under the windows 29.

The shaft 36 operates a governor shaft; that is to say, it actuates a vertical shaft 52 through bevel gears 53, the lower portion of the vertical shaft being provided with a governor 54 of any suitable construction, preferably, centrifugal type.

In the modification of the invention shown in Figures 5 and 7, the mechanism for driving the shutter is substantially the same as that described above, but instead of constructing the shutters so as to rotate respectively on the axes of the takeup rollers I simply provide a shutter in the form of a double plate 55 comprising an upper plate 55ª and a lower plate 55ᵇ (see Fig. 6). The plates 55ª and 55ᵇ are horizontal and parallel with each other, leaving a space between them. Through this space extends a scale 56 carrying the prices per yard or fractions thereof. A similar scale 57 is disposed to the right of the scale 56. The scale 56 simply extends through the double plate 55 and its ends are supported in the two frame plates 28 and 58 of the machine (see Fig. 7), the lower plate 55ᵇ is provided with side flanges 59 which are supported on arms 60 respectively, which are pivoted at 60ª on the frame of the machine. The plate 55ª is connected to the plate 55ᵇ by a strip or plate 61, and these plates are also connected together at the point of attachment of the upper arm 61ª of a lever similar to the lever 48 described above. In the normal position of the double plate 55, the edge 63 of an opening 64 in the lower plate will be disposed toward the right and in a position to cover up the reading point. Likewise the right hand edge 65 of the lower plate will operate to cover the other reading point.

The general mode of operation of the machine will now be briefly stated.

The rotation of the measuring roller 12 operates through the gear train 15, 16, etc., shown in Figure 2, to drive the gears 25 and 26 and thereby rotate the take-up rollers 9 and 10. This draws the charts 7 and 8 off of the supply drum 11 so that the numbers 31 which they carry will be presented in succession under the windows 29 of the machine, thereby enabling the machine to indicate the charges to be made for the length of goods measured, that is to say, the amount indicated by the hands 4 and 5, which are also driven through the agency of the shaft 22. Normally the roller 49 is running on the circular edge of the cam 42, thereby holding the shutters 32 and 33 under the windows 29 and over the reading point on the upper sides of the rollers 9 and 10. As each number 31 arrives under its corresponding window, the notch 43 arrives at the roller 49 thereby permitting the spring 51 to withdraw the shutters 32 and 33. This permits the numbers on the charts to be read when they are in substantially true alignment with the reading point or window.

When the measurement is completed, the clutch composed of the members 16 and 18 is opened by shoving in on the shaft 17, a button being provided on the exterior of the machine for this purpose. When the clutch is open the spring 35 rewinds the webs 7 and 8 on the chart 11, and also returns the hands 4 and 5 to their zero position.

In the forward movement of the indicating mechanism, the shaft 40 is driven in a clockwise direction; (Fig. 4) this enables the ratchet wheel 41 to drive the pawl carrier or cam 42 through the pawl 44. When the indicating mechanism is returning to zero the shaft 44 rotates in an anticlockwise direction so that the ratchet simply runs freely under the pawl 44 without effecting the shutter in any way.

The mode of operation of the modified form of the device is substantially the same as that of the preferred form. The movement of the cam swings the arm 61ª back and forth periodically so as to open each shutter long enough to display the number which is aligned with the window.

It is understood that the embodiment of the invention described herein is only one of the many embodiments my invention may take, and I do not wish to be limited in the practice of my invention nor in my claims, to the particular embodiment set forth.

I claim:

1. In a fabric measuring and cost computing machine, in combination with means adapted to function in the measuring operation for indicating the cost of the material measured by the machine embodying columns of computations based on a unit of measure and multiples or divisions thereof at different prices per unit, a shutter operating normally to cover the field of vision to be occupied by said columns, and automatic means for periodically moving said shutter from such field of vision actuated during the measuring movement at the instant that the amount of goods measured by the machine corresponds to the unit of measure of the machine or a multiple thereof, or a fractional part of said unit of measure upon which computations have been based.

2. In a measuring and computing machine, the combination of a casing indicating means mounted therein, including fractional divisions for indicating aliquot fractions of a unit of measure, said indicating means having computed numbers corresponding to the charges for different quantities measured, said quantities being expressed in the said unit and the said aliquot fractions, and movable means for preventing the reading of the computed number when the length indicated corresponds to a measure lying between the said fractional divisions.

3. In a machine of the kind described, the combination of a dial having unit and fractional divisions, indicating pointers co-operating with the dial to indicate the quantity of goods measured, in yards and fractions thereof, an indicating chart carrying computed numbers corresponding to different measured quantities indicated by the pointers, and means for preventing a reading of the chart when the said pointers are out of alignment with the division points of their co-operating scale.

4. In a machine of the kind described, the combination of a casing, a movable member mounted therein, carrying indicating numbers corresponding to integral numbers and aliquot fractions of the unit of measure, means for advancing the same to present the indicating numbers at the reading point, and movable means for preventing the reading of the indicated number at the reading point when the indicated number is out of substantially true alignment with the reading point.

5. In a measuring machine, the combination of means for indicating at a reading point the charge to be made for quantities of the measured goods expressed in a unit of measure and divisions thereof, and means for preventing the reading of the instrument at the reading point when the number indicating the cost is out of substantially true alignment with the reading point.

6. In a machine of the character described, the combination of indicating mechanism including a movable member bearing indicating numbers to be presented in succession at a reading point, means for normally covering the movable member at the reading point to conceal the numbers, and means actuated in the operation of the machine, for automatically moving the covering, means periodically to disclose any indicating number when the same is substantially truly aligned with the reading point.

7. In a machine of the character described, the combination of a casing having a window therein, indicating mechanism mounted within the casing and including a movable member bearing indicating numbers, to be presented in succession at the window, a shutter for normally screening the window, and means actuated in the operation of the machine for automatically withdrawing the shutter periodically to permit any indicating number to be seen when the same is substantially truly aligned with the window.

8. In a machine of the character described, the combination of indicating mechanism including a movable member bearing computed numbers corresponding to different quantities of a unit of measure, means for supporting the movable member so that the numbers carried thereby will be presented in succession at a reading point, a shutter for normally screening the movable member at the reading point to conceal the numbers, a cam driven with the indicating mechanism so as to revolve in synchrony with the successive presentations of the numbers at the reading point, means for actuating the shutter from the cam to withdraw the shutter and disclose each computed number when the same is substantially truly aligned with the reading point.

9. In a measuring machine, the combination of indicating mechanism including a chart bearing indicating numbers corresponding to prices of the unit of measure, means for supporting and guiding the chart so that the numbers carried thereby will be presented in succession at a reading point, a shutter for normally screening the chart at the reading point to conceal the numbers, a cam driven with the indicating mechanism so as to revolve in synchrony with the successive presentations of the numbers at the reading point, and means for actuating the shutter from the cam to withdraw the shutter and disclose any indicating number when the same is substantially truly aligned with the reading point.

10. In a measuring machine, the combination of a casing carrying a dial for indicating yards and fractions thereof, indicating mechanism including a pointer movable on the dial and also including a chart bearing indicating numbers corresponding to the indicating numbers on the dial, a fixed scale carrying numbers indicating prices per yard and fractions thereof, the indicating numbers on the chart being in alignment with the last named numbers and indicating the computed charges to be made for the different amounts of material indicated by the pointer, means for supporting and guiding the chart so that the numbers carried thereby will be presented in succession at a reading point opposite the last named scale, a shutter for normally screening the chart at the reading point to conceal the numbers, a cam driven with the indicating mechanism so as to revolve in synchrony with the pointer, and means for actuating the shutter from the cam to withdraw the shutter when the pointer is passing one of the fraction numbers on its scale, to disclose any indicating number on the chart when the same is substantially truly aligned with the reading point.

11. In a machine of the character described, the combination of a casing having a window therein, indicating mechanism mounted within the casing and including a movable member bearing indicating numbers, to be presented in succession at the window, a shutter for normally screening the window, automatic means actuated in the operation of the machine for withdrawing the shutter periodically to permit any indicating number to be seen when the same is substantially truly aligned with the window, means for returning the indicating mechanism to zero, and means for inhibiting the operation of the shutter while the indicating mechanism is returning to zero.

12. In a machine of the character described, the combination of a casing having a window therein, indicating mechanism mounted within the casing and including a movable member bearing indicating numbers, to be presented in succession at the window, a shutter for normally screening the window, automatically actuated means for withdrawing the shutter periodically to permit any indicating number to be seen when the same is substantially truly aligned with the window, means for returning the indicating mechanism to zero, and a one-way drive connection for driving the automatically actuated means during the forward movement of the indicating mechanism, said one-way drive connection operating to inhibit the operation of the shutter when the indicating mechanism is returning to zero.

13. In a machine of the character described, the combination of a casing having a window therein, indicating mechanism mounted within the casing and including a movable member bearing indicating numbers to be presented in succession at the window, a shutter for normally screening the window, means actuated in the operation of the machine for automatically withdrawing the shutter periodically consisting of a ratchet wheel mounted so as to be continuously driven when the indicating mechanism is moving in the forward direction, a pawl carrier, a spring pressed pawl carried thereby and adapted to be actuated by the ratchet wheel, means for connecting the pawl carrier to the shutter to actuate the same, and means for returning the indicating mechanism to zero after the forward movement thereof, said ratchet and pawl operating to permit a reverse movement of the ratchet wheel without actuating the shutter during the return movement of the indicating mechanism.

14. In a measuring machine, the combination of driving mechanism actuated by the article being measured, indicating mechanism including a movable member bearing indicating numbers to be presented in succession at a reading point, a movable shutter capable of screening the movable member at the reading point, a ratchet wheel driven by the driving mechanism, a pawl-carrier in the form of a cam, a spring pressed pawl carried thereby, co-operating with the ratchet wheel to enable the ratchet wheel to drive the cam when the indicating mechanism is being driven in the forward direction, means for actuating the shutter by the cam to withdraw the shutter and display the indicating numbers in succession when they are substantially truly aligned with the reading point, and means for returning the indicating mechanism to zero, said ratchet and pawl operating to permit the rotation of the ratchet wheel without moving the shutter when the indicating mechanism is returning to zero.

15. In a measuring machine, the combination of a casing having a window, driving mechanism actuated by the article being measured, indicating mechanism driven thereby including a movable chart bearing indicating numbers to be presented in succession under the window, a movable shutter capable of screening the chart below the window, a shaft, a ratchet wheel carried by the shaft, a pawl-carrier in the form of a cam loose on the shaft, a spring pressed pawl carried by the pawl-carrier and co-operating with the ratchet wheel to rotate the cam, means cooperating with the cam to withdraw the shutter whenever one of the indicating numbers is in substantially true alignment with the window, a centrifugal governor driven in unison with said shaft, and means for returning the indicating mechanism to zero after a measuring movement, said ratchet and pawl operating to permit the rotation of the shaft without actuating the cam and the shutter.

16. In a measuring machine, the combination of a casing having a window, indicating mechanism including a take-up roller and a movable chart carried thereby, said chart bearing indicating numbers to be presented in succession under the window, a pivotally mounted shutter capable of screening the chart below the window and adjacent the take-up roller, a cam driven in synchrony with the presentation of the indicating numbers under the window, and means cooperating with the cam, for withdrawing the shutter whenever one of the indicating numbers is substantially truly aligned under the window.

In testimony whereof, I have hereunto set my hand.

GREENE CARLTON HOSCH.